United States Patent [19]

Smith

[11] Patent Number: 5,292,009

[45] Date of Patent: Mar. 8, 1994

[54] BICYCLE RACK

[76] Inventor: Terrance R. Smith, 13 Bateman Dr., Nepean, Ontario, Canada, K2G 4N7

[21] Appl. No.: 996,701

[22] Filed: Dec. 24, 1992

[51] Int. Cl.⁵ .............................................. A47F 7/00
[52] U.S. Cl. ........................................... 21/20; 211/19
[58] Field of Search ................ 211/19, 20, 17, 23, 211/24

[56] References Cited

U.S. PATENT DOCUMENTS

| | | | |
|---|---|---|---|
| 4,345,705 | 8/1982 | Graber | 211/20 X |
| 4,416,379 | 11/1983 | Graber | 211/19 |
| 4,442,961 | 4/1984 | Bott | 211/20 X |

FOREIGN PATENT DOCUMENTS

815269  6/1959  United Kingdom ................. 211/19

Primary Examiner—Alvin C. Chin-Shue
Assistant Examiner—Sarah A. Lechok
Attorney, Agent, or Firm—Bauer & Schaffer

[57] ABSTRACT

A bicycle rack consisting of a channel member having a wall on one side and a stepped base, and retaining and locking means to hold a bicycle is provided. The rack permits easy entry and removal of a bicycle from a horizontal, vertical or overhead position. Means are also provided to permit locking of a bicycle to the rack. Accessories are provided to support a bicycle while being repaired, and to protect a rear bicycle fender when a bicycle is parked vertically.

14 Claims, 12 Drawing Sheets

BICYCLE RACK

Bicycle-owner and commercial bicycle parking and storage needs vary from upside down (ceiling) to vertical (on walls or other vertical surfaces) to horizontal (on the ground or off the ground on walls or other vertical surfaces).

Bicycle dealers have similar needs for storing and displaying bicycles, and often have additional needs for displaying their bicycles.

It is also advantageous for bicycle dealers to be able to use for their own displays and storage the same products that they wish to sell to their customers.

Many bicycle owners transport and repair their own bicycles and, because these needs arise only infrequently, require inexpensive systems to help them perform these occasional functions.

Many conditions affect the above needs. As a result, the normal consequence is that a separate product, or the same product in a different size, must be purchased to meet the new needs or conditions. For example:

a. Changes in location, availability of space and/or the number of bicycles to be stored, parked or displayed.
b. Changes in bicycles or tire or wheel sizes.
c. Changes in habits, e.g. from an occasional cyclist to a racer or avid commuter.
d. Changes in security needs or locking devices.
e. Changes in dealer marketing strategies.
f. Changes in physical abilities because of age or injuries.

It is the purpose of this invention to meet all of the needs and conditions noted above and to do so in such a manner that, when any of these needs or conditions change, the invention will accommodate the new needs at little or no expense.

It is a further purpose of the invention to satisfy all of the foregoing needs with a product that requires a minimum amount of material to manufacture and a minimum amount of space to store and to contribute as much as is possible to environmental needs.

It is also an object of the invention to provide a bicycle rack adapted to accommodate bicycles having tires of various widths and diameters.

A principle object of the invention is to provide a bicycle rack comprising an elongate channel adapted for securement to a supporting surface; bicycle retaining means adapted for engagement with said channel and to support and retain a bicycle thereon; said channel having a base portion and a unitary wall extending at right angles from said base portion; said base portion of said channel being stepped along its length to form an inner, deeper portion adjacent said wall, and an outer, shallower portion, with an elongate narrow wall therebetween; said outer shallower portion having a short lip extending upwardly and outwardly therealong; and openings in said walls and said lip of said channel adapted for engagement with said bicycle retaining means.

Reference will now be made to the attached drawings in which:

FIG. 1b is a perspective view of a bicycle rack according to the invention, illustrating two optional accessory portions, also shown in perspective view;

FIG. 1c is a detail, partly in section, of one of the accessories of FIG. 1b;

FIG. 3 is a sectional view taken along line III—III of FIG. 1a;

Detailed reference will now be made to the drawings wherein like reference numerals will identify like parts.

Figure 1A:
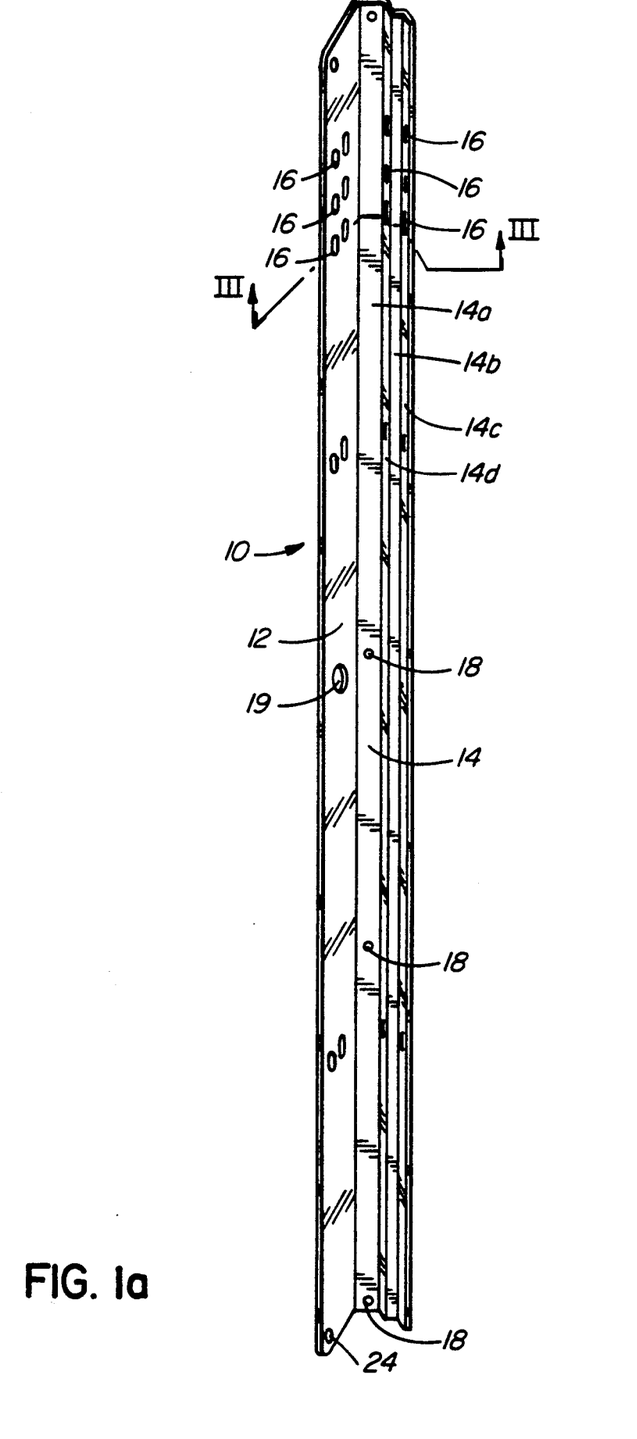
FIG. 1a is a perspective view of a bicycle rack according to the invention.

Referring to FIGS. 1a and 1b, an elongate L-shaped bicycle rack is indicated generally at 10, and has a side wall 12 and base 14 unitary therewith, and extending outwardly at right angles therefrom. Base 14 provides a pair of elongated channels 14a and 14b, channel 14b having a unitary, forwardly projecting lip 14c. A plurality of evenly spaced oblong holes 16 are provided near the upper end of wall 12, and corresponding oblong openings are provided in lip 14c of channel 14b, and in outer wall 14d of channel 14a. Oblong holes 16 are adapted to receive bicycle tire engaging locking clips, straps, locking pins, or securement pins, as will become clear hereinafter.

The base of channel 14a is provided with a plurality of holes 18, to receive screws, lag bolts, or bolts, to secure the bicycle rack to a supporting surface. A locking hole 19 is provided in wall 12 of channel 10, to receive a locking cable or chain, for securement of the bicycle frame.

Figure 3:
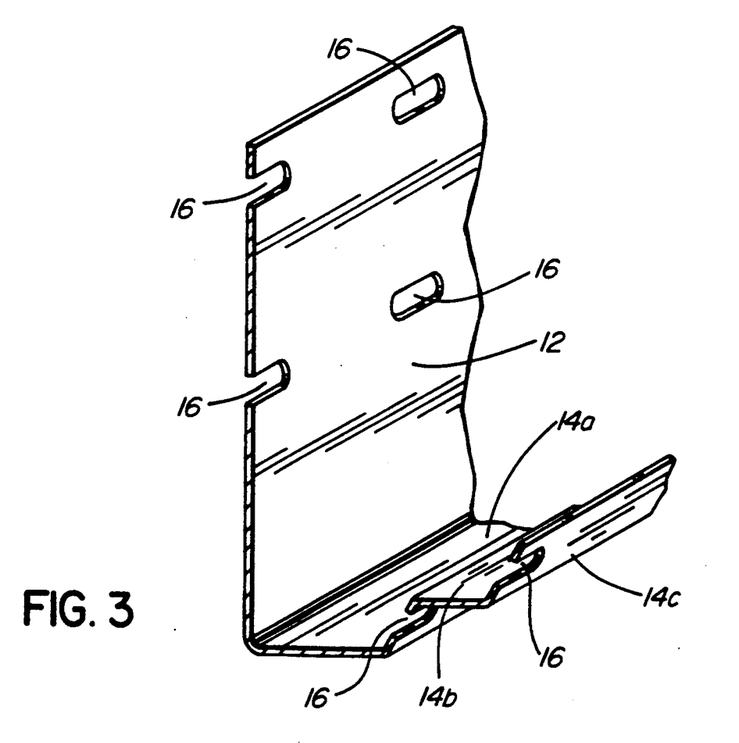

The configuration of bicycle rack 10 is more clearly illustrated in FIG. 3, which is a sectional view taken along III–III of FIG. 1b.

Figure 2:
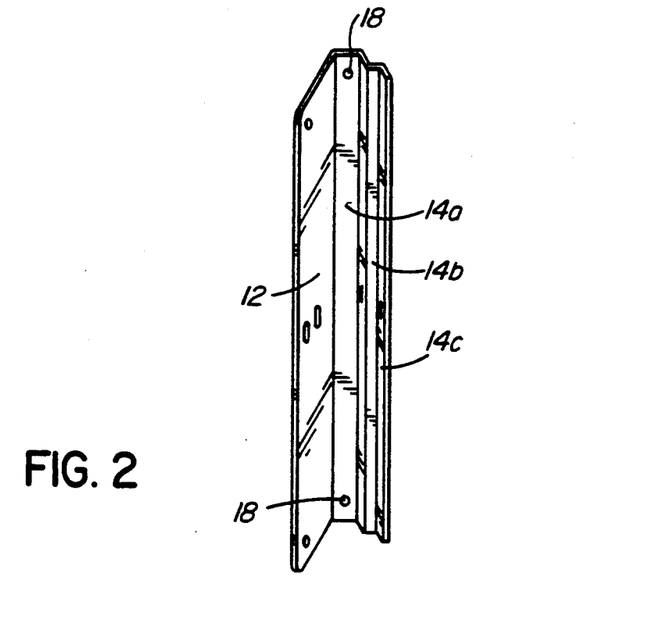
FIG. 2 is a perspective view of a bicycle rack according to the invention but of shorter length, two of which are used.

Referring to FIG. 2, a shorter bicycle rack, having the same sectional configuration as that illustrated in FIGS. 1 and 2 is shown. As will become clear hereinafter, the rack of FIG. 2 is adapted to support one wheel of a bicycle, and two rack portions as illustrated in FIG. 2 will be required, spaced apart so as to be centered directly opposite the wheel axles of a bicycle being supported. The rack of FIG. 2 is also adapted to be affixed to a supporting surface, using screws or bolts, through holes 18 provided in the base of channel 14a.

Figure 4:
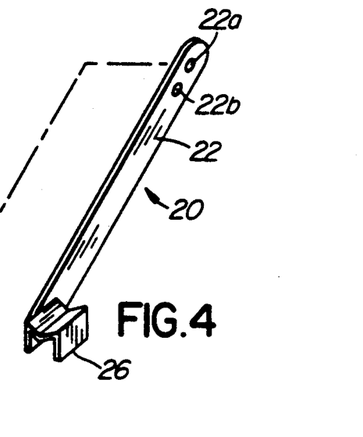
FIG. 4 is a perspective view of a wheel-support for optional use with the bicycle rack according to the invention.

An optional wheel-support 20, for use in combination with the rack of FIGS. 1a, 1b, is illustrated in FIG. 4.

Wheel ramp 20 comprises a pivot arm 22 adapted to be attached to hole 24 in the base of wheel rack 10, as seen in FIG. 1b, as with a bolt, rivet, or the like, through either of attachment holes 22a or 22b. Wheel ramp 20 includes a rotatable wheel support 26 pivotably mounted at the end of arm 22, to provide support for the wheel of a bicycle equipped with a rear fender, so as to protect the fender, and prevent it coming in contact with a surface below bicycle rack 10. Holes 22a and 22b permit the wheel ramp to be selectively attached to hole 24 of rack 10, and thus to accommodate different bicycle wheel sizes.

Figures 5, 5A:
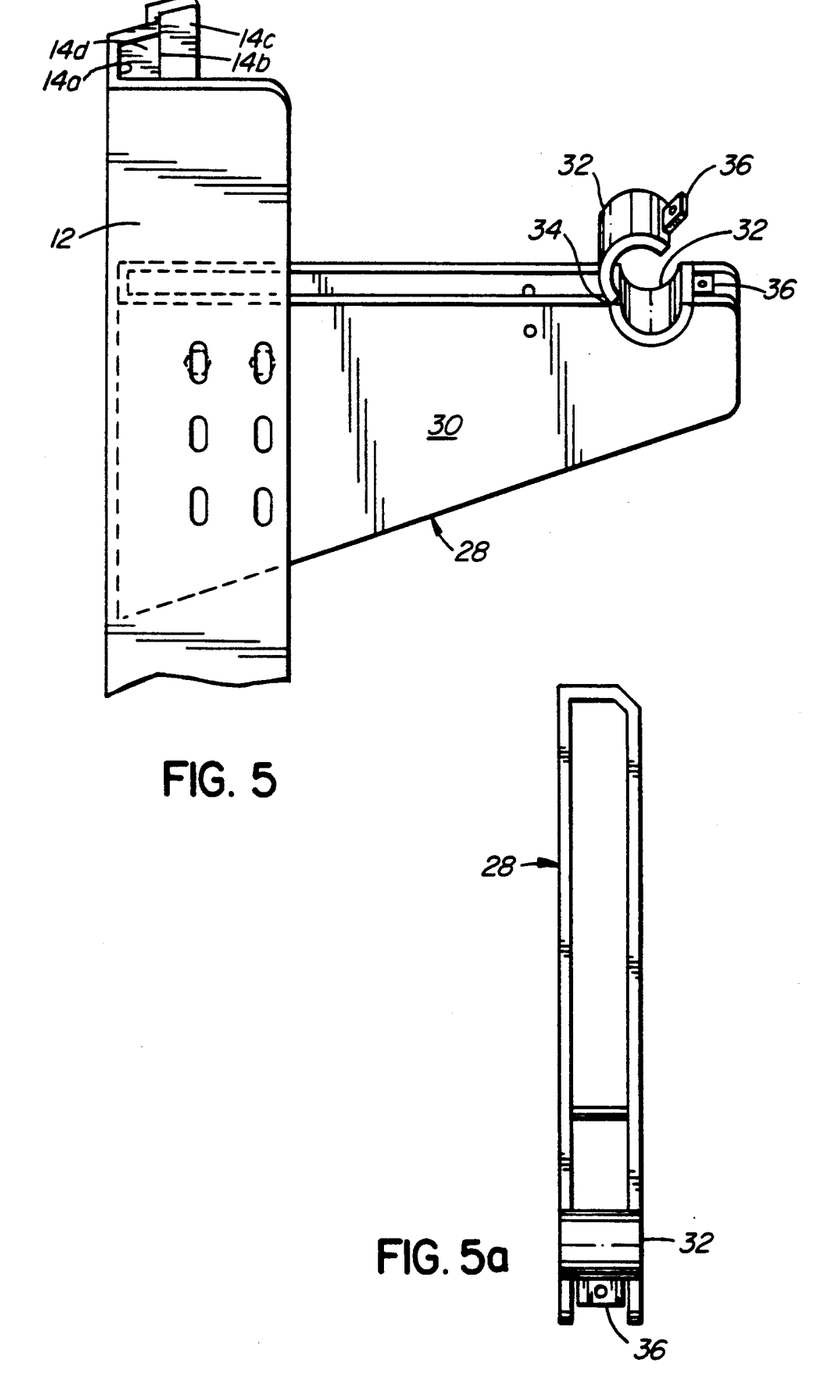
FIG. 5 is a detail of a bicycle repair stand bracket, partly in section, for use in association with a bicycle rack according to the invention.
FIG. 5a is a top plan view of the bicycle repair stand bracket of FIG. 5.

An optional bicycle repair stand is illustrated in FIGS. 5 and 5a. Bicycle repair stand bracket 28 comprises a pair of spaced-apart horizontal parallel arms 30, supporting a cylindrical clamp 32, being hinged at 34, and having a pair of outwardly extending flanges 36. The inner surface of clamp members 32 may be coated with rubber of other cushioning material on the inner surface. Clamp 32 is adapted to engage the cross bar (or tope tube) of a bicycle frame, and to be closed therearound, after which flanges 36 may be secured together with a bolt and wing nut, or with a pair of clamping pliers.

As seen in FIG. 1b, a U-lock shield 21 is adapted to be affixed to rack 10, by means of bolts, rivets or the like, through holes 21a provided therein, and holes 21b in wall 12 of rack 10, and, as well, through hole 21c of U-lock shield 21, and hole 18 in the base of channel 14a. A U-lock 23 may be engaged with U-lock shield 21, through hole 21d therein. U-lock shield 21 projects away from rack 10, at right angles therefrom, with the outer portion being angled away from the rack, so as to avoid direct contact with a chain stay of a bicycle which is to be locked to the U-lock shield 21. Referring to detail FIG. 1c, the periphery of U-lock shield 21 may be provided with a rolled hem encasing a steel cable 25, to swart attempts to cut through U-lock shield 21 by hacksaw or the like.

Figure 6A:
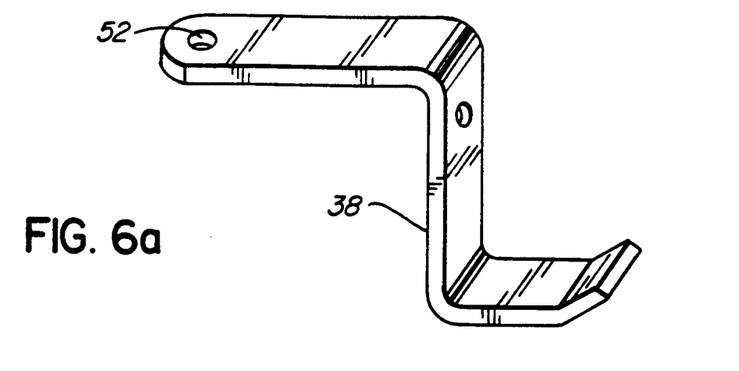
FIGS. 6a and 6b are perspective views of locking pins for use with the bicycle rack.
Figure 6B:
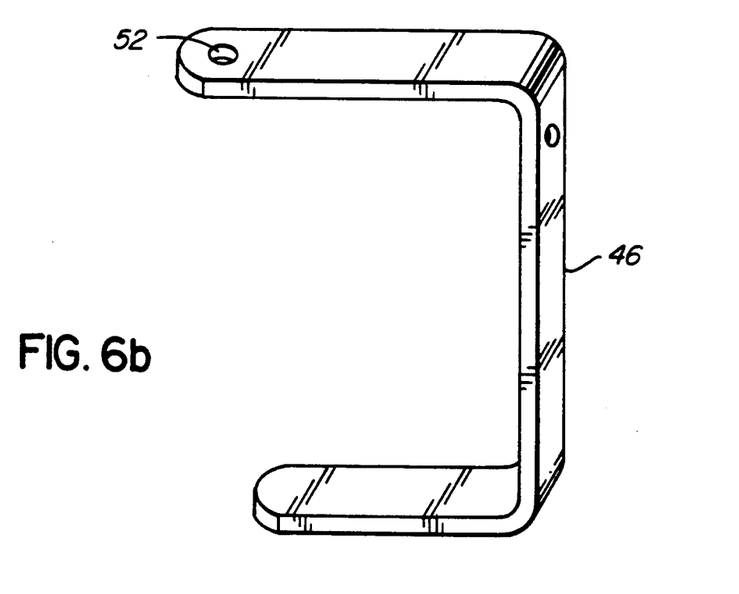
Figure 6C:
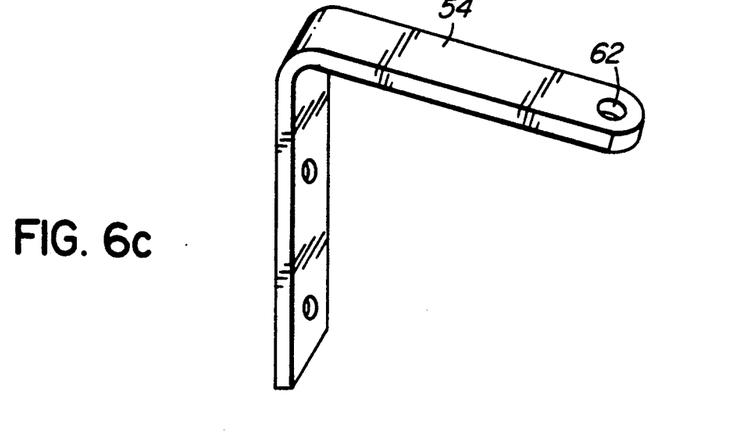
FIG. 6c is a perspective view of a securement pin for use in association with the bicycle rack.

FIGS. 6a and 6b illustrate two embodiments of locking pins for use in association with the bicycle rack according to the invention, and FIG. 6c illustrates a securement pin, also for use with the rack according to the invention.

Figure 7A:
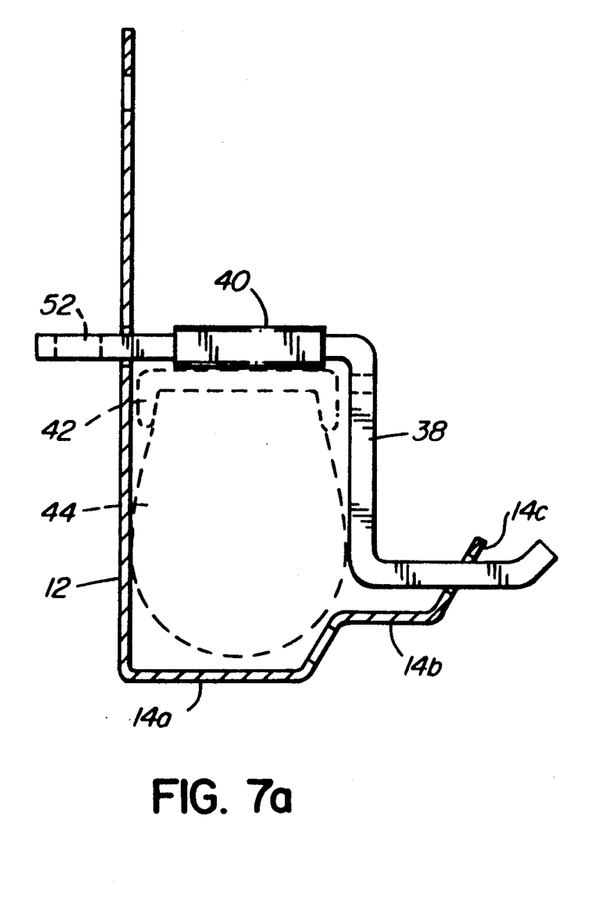
FIGS. 7a and 7b are top plan views, partly in section, of the locking pins according to FIGS. 6a and 6b.

Locking pin 38 of FIG. 6a is also illustrated in FIG. 7a in engagement with rack 10, having passed through one of holes 16 in wall 12 of rack 10, and one of holes 16 in outer lip 14c thereof. Locking pin 38 may be provided with a plastic covering, so as to protect rim 42 of a bicycle secured to rack 10. As seen in FIG. 7a a bicycle tire 44 of small to medium size is engaged within channel 14a of the bicycle rack.

Figure 7B:
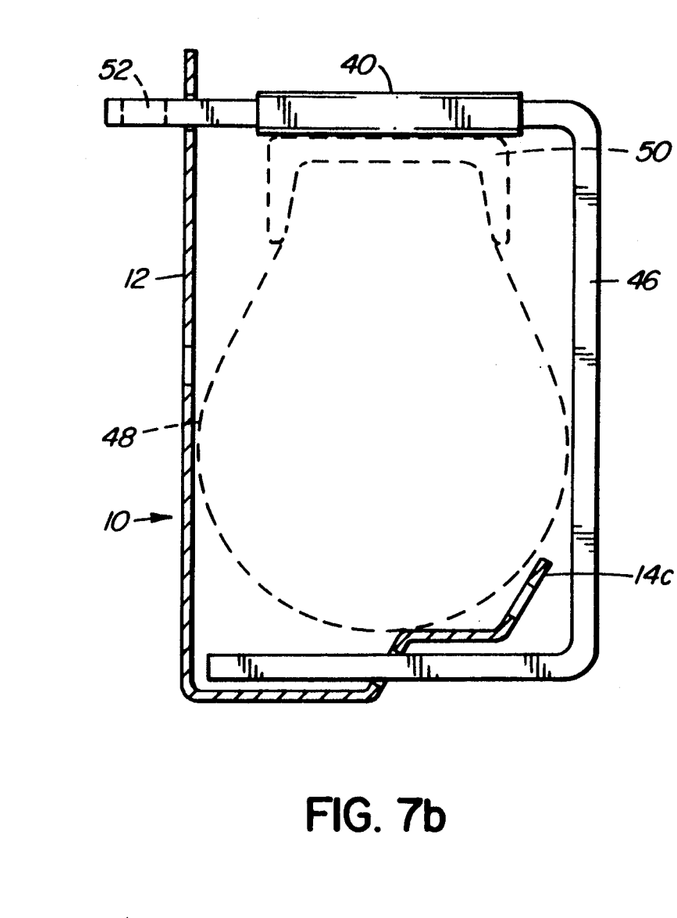

Referring now to FIG. 7b, the locking pin 46 of FIG. 6b is shown engaged with holes 16 in channel 10, and a wide tire 48 is secured within channel 10, and retained by lip 14c and sidewall 12 of channel 10. Rim 50 rests against locking pin 46, the upper arm of which may be coated with plastic, as in the embodiment of FIG. 7a, to prevent damage to bicycle rim 50.

In both the embodiments of FIGS. 7a and 7b locking pins 38 and 46, respectively, may be locked to the bicycle rack 10, through the use of a lock inserted in hole 52 provided in locking pins 38, 46, and which is on the exterior of wall 12, when locking pins 38, 46, are engaged therewith.

Figure 7C:
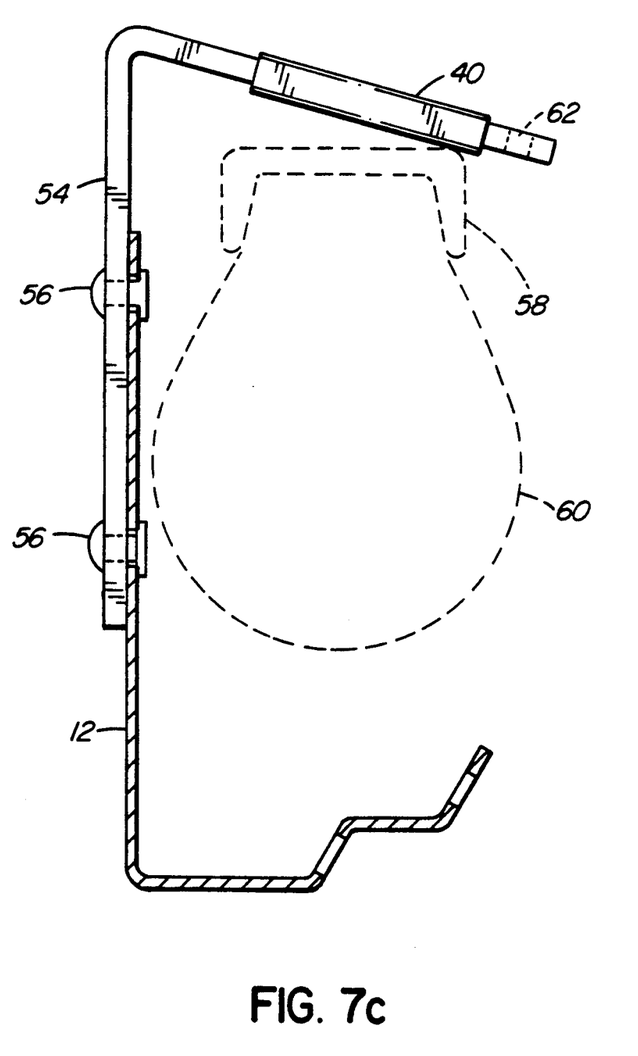
FIG. 7c is a top plan, partly in section of the securement pin of FIG. 6c in position for wide tires.
Figure 8:
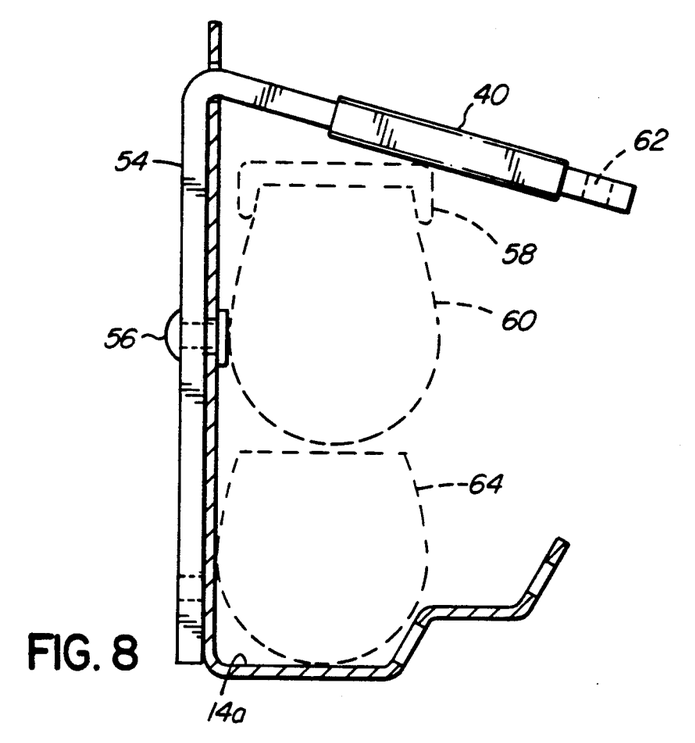
FIG. 8 is a top plan view, partly in section, of the securement pin of FIG. 6c in position for narrow tires.
Figure 8A:
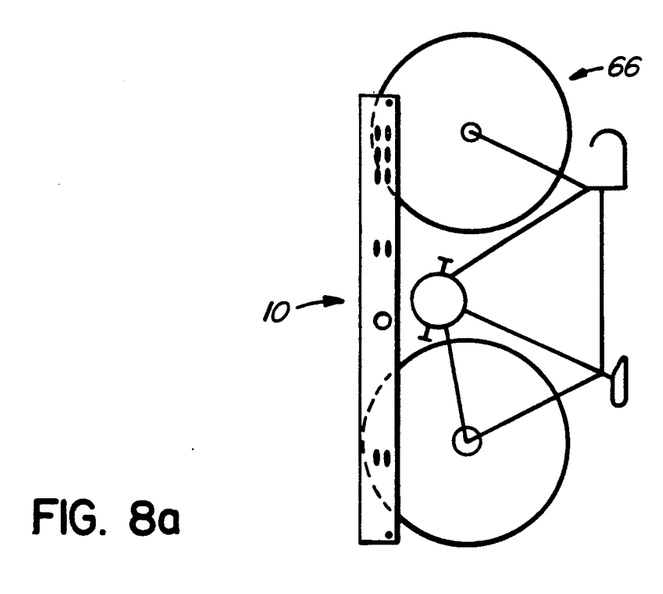
FIG. 8a is a side elevation of a rack in a vertical according to the invention, with a bicycle secured thereto.

Referring now to FIGS. 6c and 7c, a securement pin 54 is adapted to be affixed to wall 12 of bicycle rack 10 as by means of bolts or rivets 56. Securement pin 54 is configured at an angle of no more then 75°, and is adapted to support a rim 58 of a bicycle wheel 60, and to urge the rim 58 and associated tire 60 inwardly toward wall 12 of the bicycle rack. Securement pin 54 is provided with an opening 62, to receive a locking cable, to secure the bicycle wheel to the rack. As seen in FIG. 8, a small to medium size front bicycle wheel 60 is supported by securement pin 54, and a rear bicycle wheel 64 is shown supported by channel 14a. As seen in FIG. 8a a bicycle 66 is supported vertically on rack 10, and with securement pin 54 affixed to the rack 10 at a point in horizontal alignment with the front axle, the front wheel of the bicycle will be secured in the rack 10, and is urged toward wall 12 thereof, while the rear bicycle wheel 64 of FIG. 8 is urged forwardly within rack 10, through gravity, to secure itself in channel 14a and prevent sideways movement. If the tire is wide, the same principle applies except the rear wheel is secured by gravity in channel 14b between wall 12 and lip 14c.

Figure 9A:
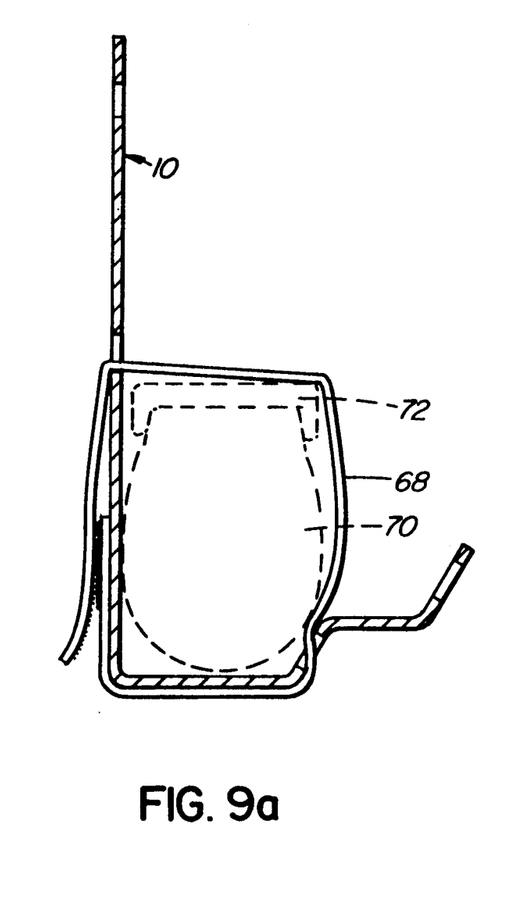
FIGS. 9a and 9b are sectional views of the rack according to the invention, illustrating spring securement clips affixed thereto.
Figure 9B:
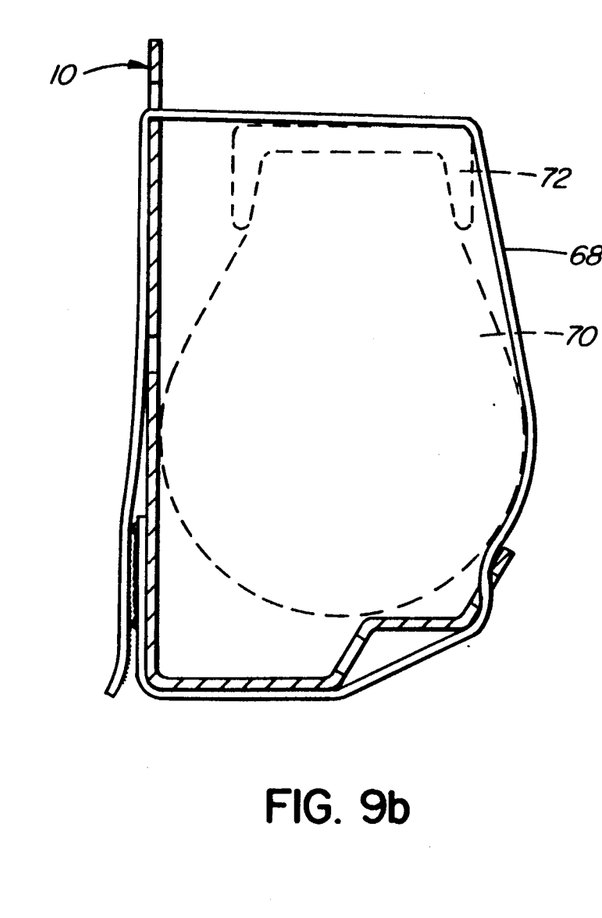

Reference will now be made to FIGS. 9a and 9b, being sectional views through rack 10, employing straps 68 to retain a bicycle wheel thereto. Illustrated in FIG. 9a is a small or medium bicycle tire 70, and its associated rims 72, while in FIG. 9b a large bicycle tire 70 and its associated rim 72 is shown. Strap 68 is passed through holes 16, at a point approximately in horizontal alignment with the front axle of the bicycle, and is secured to itself as by Velcro (trade mark) or the like.

Figure 10A:
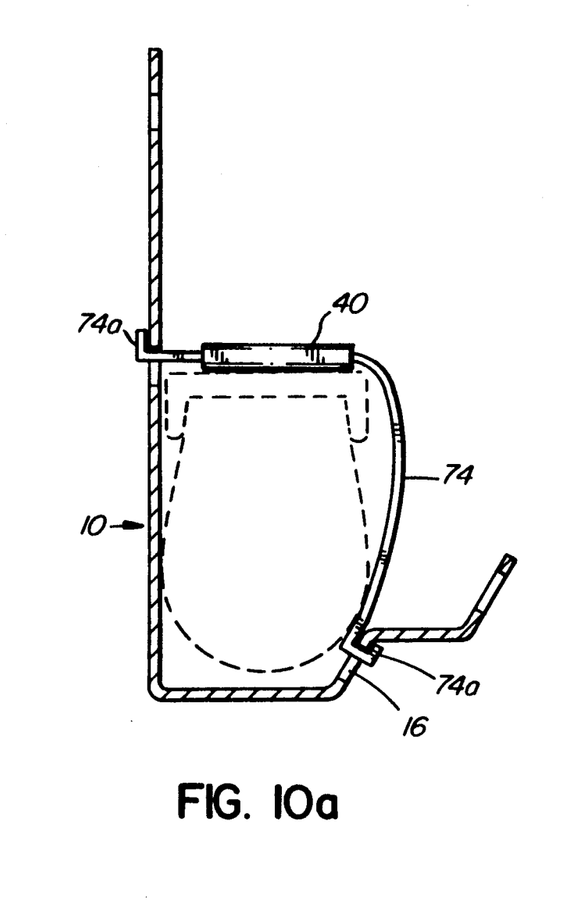
Figure 10B:
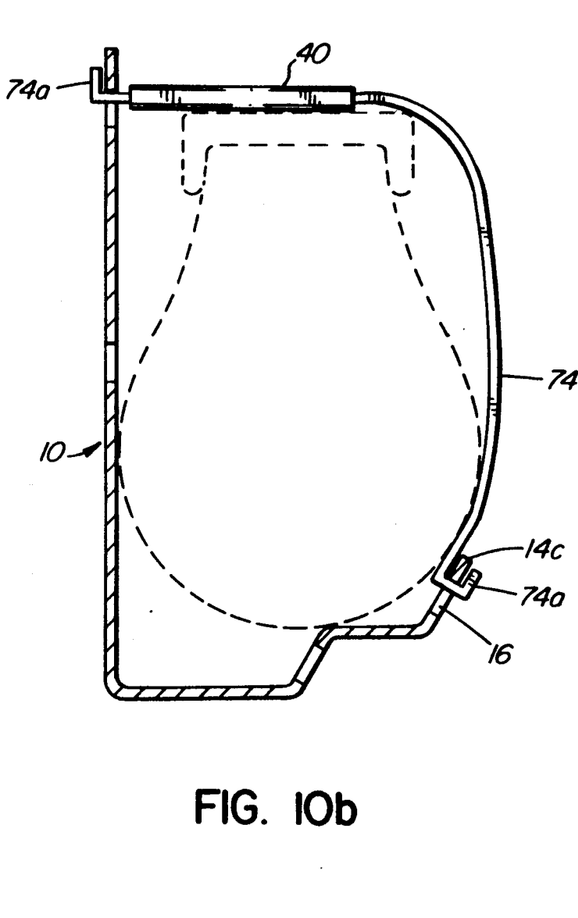

Illustrated in FIGS. 10a and 10b are spring clips 74, identically configured, spring clip 74 of FIG. 10a being adapted for a small to medium bicycle tire, clip 74 of FIG. 10b being adapted to secure a large bicycle tire to rack 10. Clips 10a are of spring steel or the like, and are provided with a lip 74a at each end thereof, to be engaged with a hole 16 in channel 10, spring clip 74 also being provided with a plastic coating on the portion thereof that will come in contact with a bicycle wheel rim.

As will be evident from the foregoing description, the location of the holes 16 is important. Oblong holes 16 must be provided in rack 10, so that there is a hole that will be within ⅛ of an inch of the front wheel axle of a bicycle in place on a rack 10, measured vertically.

Referring now to FIGS. 11a through 11j, the versatility of the bicycle rack according to the invention will be evident.

Figures 11A, 11B, 11C, 11D, 11E:
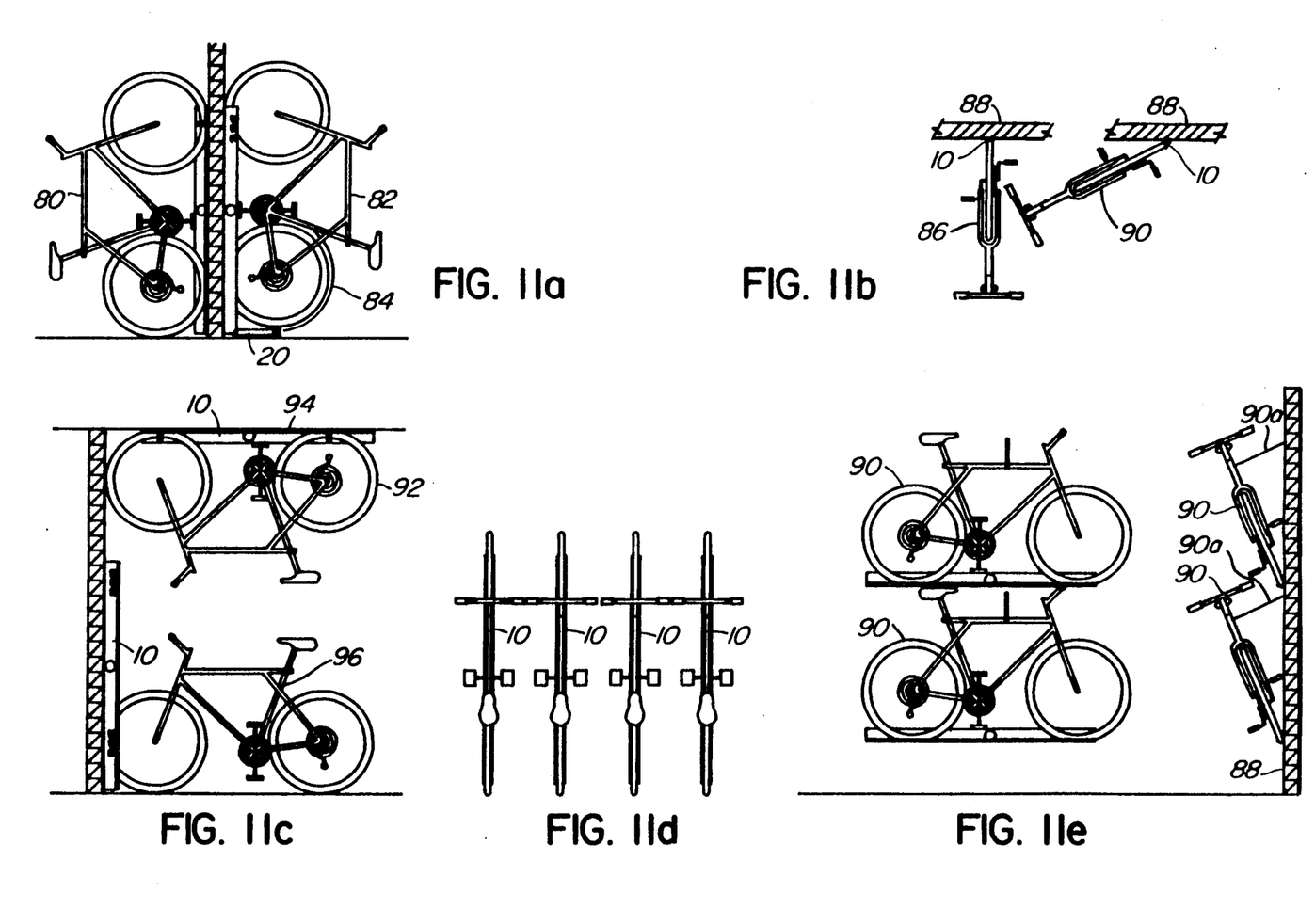
FIGS. 11a through 11j are schematic views illustrating various uses of the bicycle rack according to the invention.

As seen in FIG. 11a a bicycle 80 without a fender is shown supported on a rack 10, and a bicycle 82, with a rear fender 84 is supported on wheel ramp 20, so as to avoid damage to fender 84.

In FIG. 11b, two bicycles are illustrated in top plan, bicycle 86 being supported on rack 10 at right angles to the supporting surface 88, while bicycle 90 is supported by a rack 10 mounted at an acute angle that is limited only by the pedal of bicycle (see also FIG. 11e).

In FIG. 11c a bicycle 92 is shown stored overhead on a ceiling 94, on rack 10, with wheels secured a pair of securement means 6a, 6b, 6c, 68 or 74.. Bicycle 96 is shown parked in a temporary manner, through securement of its front wheel to rack 10.

In FIG. 11d, four bicycles are illustrated in front elevation, supported by four racks 10.

In FIG. 11e, two bicycles 90 are shown secured horizontally and at an angle, with the bicycles being illustrated in side elevation, and in front plan. Bicycles 90 are held by straps 90a, at an angle from the horizontal supporting surface 88, the angle being dictated by the projecting pedals facing supporting surface 88.

Figure 11F:
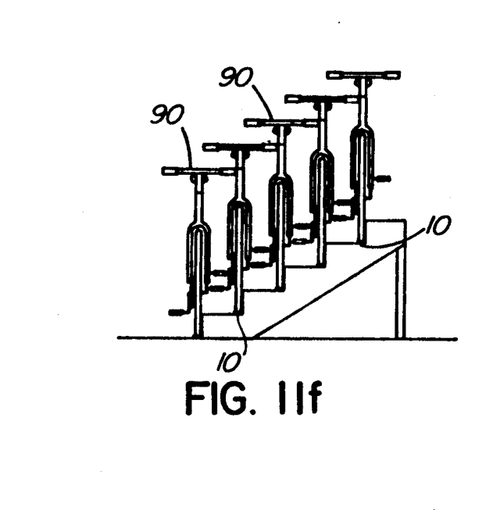

FIG. 11f shows a plurality of bicycles 90 supported by racks 10, in a tiered manner with bicycles supported by a strut or other common device attached to the bicycle frame at one end, and the stepped portion of the display at the other end.

Figure 11G:
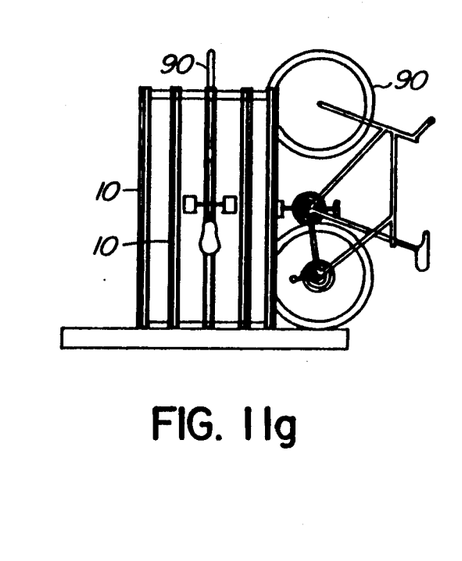

FIG. 11g illustrates a plurality of racks 10 mounted on a circular support member, so that bicycles 90 may be displayed on a revolving base.

Figure 11H:
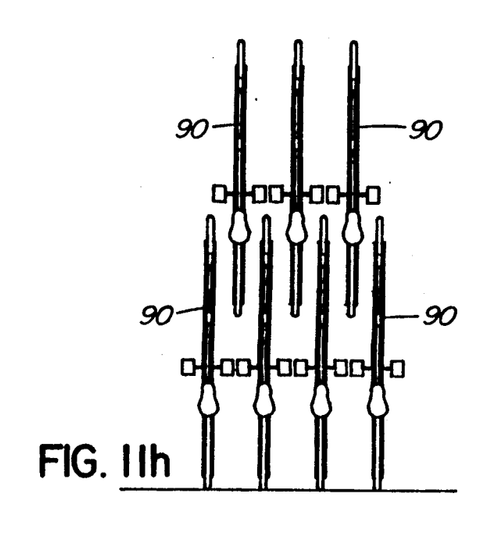

FIG. 11h illustrates a plurality of bicycles 90 mounted for display or storage, on racks 10, with the handlebars having been rotated on the handlebar stem into alignment with the bicycle frame, to minimize the space required for such storage or display.

Figure 11I:
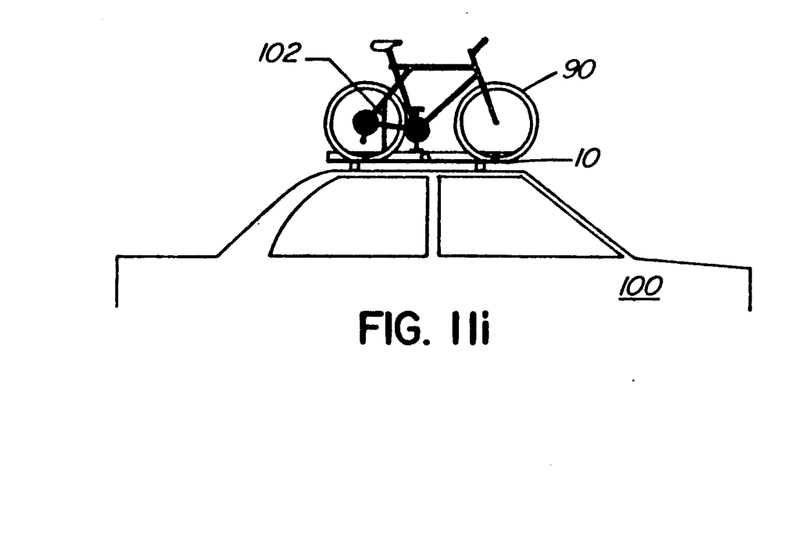

FIG. 11i illustrates a bicycle 90 supported on a rack 10 on an automobile 100. A securement strut 102 to attach the frame of bicycle 90 to rack 10 is provided.

Figure 11J:
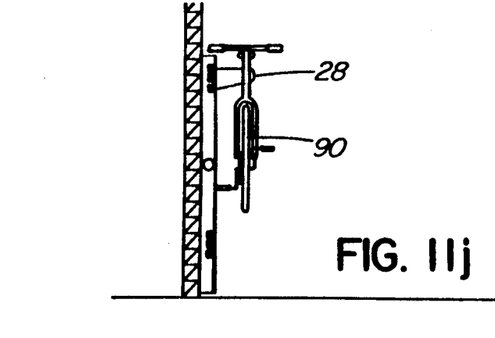

In FIG. 11j a bicycle 90 is mounted on a bicycle repair stand (28) as illustrated in FIG. 5.

As will be evident from the foregoing description, the bicycle rack according to the invention eliminates the need to lift a bicycle off the ground to store or park the bicycle in a vertical position, thereby eliminating back or other injuries associated with such lifting. At the same time, the invention allows bicycles to be stored or displayed off the ground if that is the wish of the rack user.

As has been described, the bicycle may be secured to the rack through the use of an easy-access securement pin 54 (see FIG. 6c, 7c and 8) the pin having the great advantage that the user does not have to reach into the channel to secure the bicycle, as is necessary when a spring clip, locking clip or securement strap are used. The advantage of the easy access securement pin to bicycle dealers is self-evident, and permits quick and easy entry and removal of bicycles which are stored off the floor on walls, or other supports. The accommodation of different size tires has been described heretofore. The use of locking pins as illustrated in FIGS. 6a, 6b, 7a and 7b permits secure locking of the front wheel of the bicycle. If the locking pin 38, or 46, is left locked to the bicycle rack while the bicycle is being used, it will ensure that a reserved bicycle parking rack is available for the owner, upon his return.

The two-piece bicycle rack, as described with reference to FIG. 2 hereinbefore, may be manufactured of plastic or of metal, at minimum cost. The embodiment of FIG. 2 has the added advantage of reducing packaging and storage costs.

There are at least five significant advantages achieved through the structure of rack 10, and the provision of one side of the rack which is substantially open. This design has these advantages:

1. With the use of an easy access pin 54 (see FIGS. 7c and 8), entry of the front wheel 60 is possible from the side, and the user placing a bicycle on rack 10 does not have to reach in to secure the bicycle when it is in the vertical position, but simply hook rim 58 inside arm 62 of pin 54.
2. The open side of channel 10 permits the bicycle wheel (and of course its associated bicycle) to be angled away from a supporting wall so as to clear the bicycle pedals when a bicycle is in the horizontal position on a wall.
3. With reference to FIG. 1b, wheel ramp 20, when not required to support a wheel of a bicycle having a rear fender, may be pivoted upwardly so that it fits within channel 10, with the open underside of wheel support 26 exposed, so as to receive a rear wheel of a bicycle having no rear fender.
4. Tight securement of bicycle wheels is easily accomplished through the use of straps 68 (see FIGS. 9a and 9b).
5. The spring clips 74 of FIGS. 10a and 10b provide quick and easy attachment of a bicycle to rack 10. Further, spring clips 74 may be manufactured very economically, so as to minimize cost of a secure bicycle rack.

The foregoing is by way of example only, and the invention should be limited only by the scope appended claims.

I claim: The embodiments of the invention in which an exclusive privilege is claimed are defined as follows:

1. A bicycle rack comprising:
   an elongate channel adapted for securement to a supporting surface;
   bicycle retaining means adapted for engagement with said channel, and to support and retain a bicycle thereon;
   said channel having a base portion and a unitary wall extending at right angles from said base portion;
   said base portion of said channel being stepped along its length to form an inner, deeper portion adjacent said wall, and an outer, shallower portion with elongate, narrow wall therebetween;
   said outer shallower portion having a short lip extending upwardly and outwardly therealong; and
   openings in said walls and said lip of said channel adapted for engagement with said bicycle retaining means.

2. A bicycle rack according to claim 1, said bicycle retaining means comprising an acute angled L-shaped pin adapted to be affixed to the wall of the channel and project above the base thereof so as to receive a front bicycle wheel therebetween.

3. A bicycle rack according to claim 1, said bicycle retaining means comprising an L-shaped spring clip having an outwardly turned lip at each end thereof and being adapted to engage an opening in said wall at one of its ends and an opening in said lip at its other end, and to surround and retain a front bicycle wheel within said channel and said spring clip.

4. A bicycle rack according to claim 1, said bicycle retaining means comprising a strap having self-securement characteristics and adapted to pass through an opening in said wall and an opening in said lip to surround and retain a front bicycle wheel within said channel and said strap.

5. A bicycle rack according to claim 1, said bicycle retaining means comprising a U-shaped bracket affixed at its closed end to said wall of said channel and having a unitary tubular clamp at its open end, said clamp being adapted to receive and support a bicycle by a frame member, to facilitate repair or servicing of the bicycle.

6. A bicycle rack according to claim 1, bicycle retaining and support means including a pivotable arm mounted at one of its ends near the bottom of said channel and having a rotatable wheel-support member at its other end, said wheel-support member being adapted to support a rear bicycle tire having an associated fender and to prevent the weight of the bicycle being applied to the rear fender when the bicycle is retained in a vertical position by said rack.

7. A bicycle rack according to claim 6, said pivotable arm and wheel-support member being adapted to pivot upwardly to be received entirely within said channel.

8. A bicycle rack according to claim 1, for a bicycle having front and rear wheels each mounted on an axle, said elongate channel having a length at least equal to the distance between the outer edge of the rear tire of the bicycle and the front axle thereof.

9. A bicycle rack according to claim 1 said wall and lip of said channel having a plurality of equally spaced oblong holes near one end thereof, adapted to receive bicycle retaining means in the form of pins, clips or straps.

10. A bicycle rack according to claim 2, said bicycle retaining means including a portion adapted to project through said wall a sufficient distance so as to permit the presence of a lock-receiving hole.

11. A bicycle rack according to claim 1, said channel comprising a pair of identically configured portions.

12. A bicycle rack according to claim 4, said channel comprising a pair of identically configured portions.

13. A bicycle rack according to claim 1, said channel having a triangular shield projecting outwardly therefrom near the lower end of the channel, the shield having an opening to receive a U-lock so as to permit locking of the rear wheel of a bicycle thereto.

14. A bicycle rack according to claim 4, said channel having a triangular shield projecting outwardly therefrom near the lower end of the channel, the shield having an opening to receive a U-lock so as to permit locking of the rear wheel of a bicycle thereto.

* * * * *